2 Sheets—Sheet 1.

A. W. GIFFORD.

MACHINES FOR MAKING METAL SCREWS.

No. 7,446. Reissued Dec. 26, 1876.

Witnesses.

S. N. Piper

L. M. Nellis

Albert W. Gifford.

by his attorney

R. H. Eddy

THE NORRIS PETERS CO., WASHINGTON, D. C.

2 Sheets—Sheet 2.

A. W. GIFFORD.

MACHINES FOR MAKING METAL SCREWS.

No 7,446 Reissued Dec. 26, 1876.

Witnesses.

S. N. Piper.

L. M. Wallace

Albert W. Gifford.

by his attorney

R H Eddy

I. NOM.

THE NORRIS PETERS CO., WASHINGTON, D. C.

UNITED STATES PATENT OFFICE.

ALBERT W. GIFFORD, OF WORCESTER, MASSACHUSETTS.

IMPROVEMENT IN MACHINES FOR MAKING METAL SCREWS.

Specification forming part of Letters Patent No. 168,150, dated September 28, 1875; reissue No. 7,446, dated December 26, 1876; application filed December 11, 1876.

*To all whom it may concern:*

Be it known that I, ALBERT W. GIFFORD, of the city and county of Worcester, and State of Massachusetts, have invented a new and useful Machine for Use in Making Metallic Screws; and do hereby declare the same to be fully described in the following specification and represented in the accompanying drawings, of which—

Figure 1:
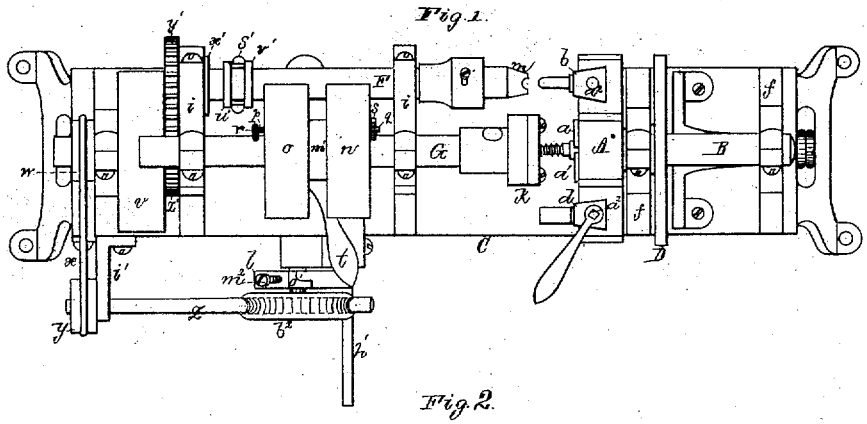
Figure 2:
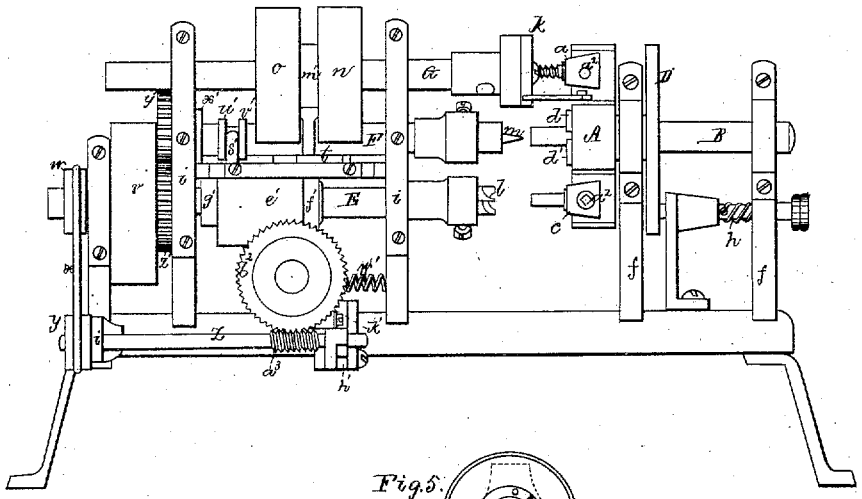
Figure 5:
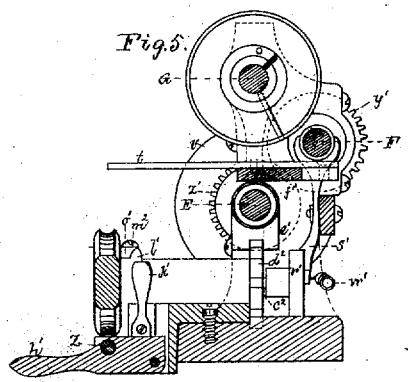
Figure 4:
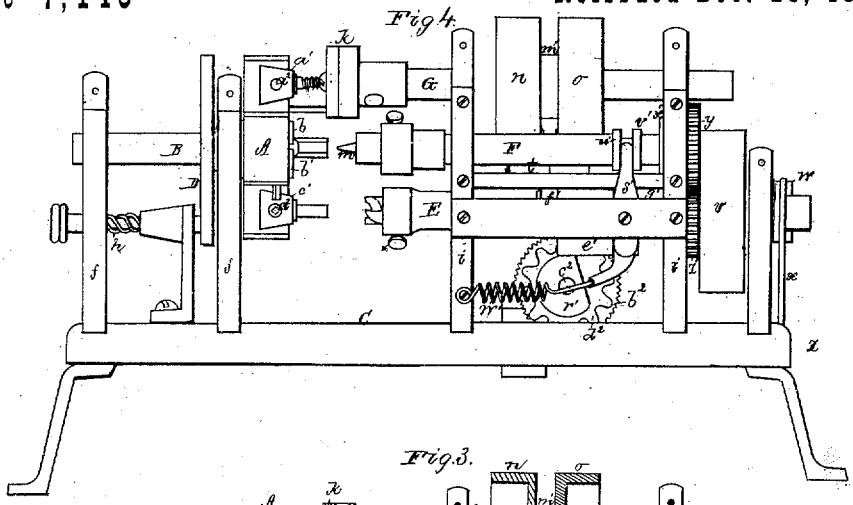
Figure 3:
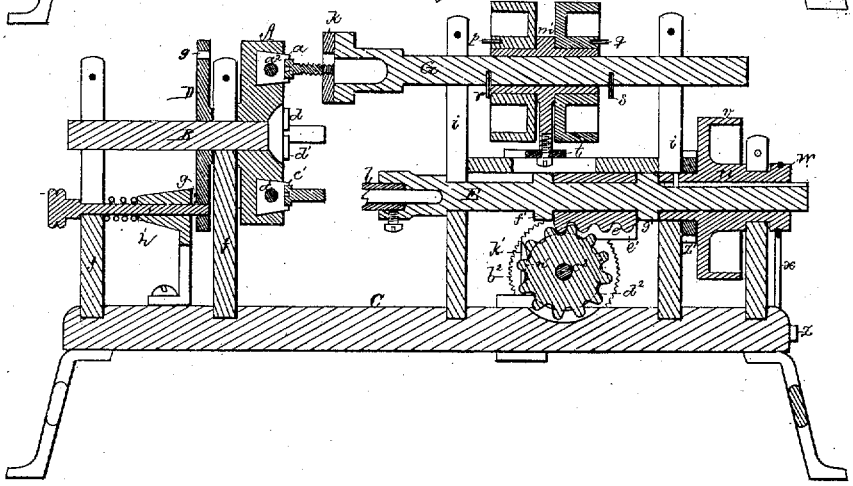

Figure 1 is a top view, Fig. 2 a front elevation, Fig. 3 a longitudinal section, Fig. 4 a rear elevation, and Fig. 5 a transverse section, of such machine.

My invention in a machine for milling and threading screws consists, in the main, in the combination of mechanism for holding a series of screw-blanks, with mechanism for milling or shanking one, and simultaneously pointing or threading, or both pointing and threading, others of them, as hereinafter described, while an attendant may be in the act of removing from the machine a screw-blank already held milled and pointed or threaded, or both pointed and threaded, and substituting therefor a blank in turn to be milled and pointed or threaded, or both pointed and threaded.

My invention further consists in the machine as constructed with a rotary head, provided with sets of jaws, as and for the purposes as hereinafter explained, in combination with a series of arbors arranged to operate with such head, and furnished with tools to effect simultaneously the operations of milling or shanking one screw-blank and pointing or cutting or forming a thread on another, while an attendant may be in the act of removing a finished screw from one set of the holders or jaws of the head, and substituting for said screw a blank to be operated on in turn, the said arbors being provided with mechanism for operating them, as hereinafter explained.

My invention further consists in the combination of a latch and an escapement, as constructed and arranged in manner substantially as hereinafter specified.

My invention further consists in the combination of the latch and escapement, as set forth, with a lever and a feeding mechanism of one of the arbors of the machine.

My invention further consists in the combination of a sleeve and certain studs with two pulleys and the screw-threading arbor, all being applied and to operate substantially as specified.

In the drawings, the rotary head is shown, at A, as fixed to an arbor, B, and provided with four sets of clamping-jaws, $a\ a^1\ b\ b^1\ c\ c^1\ d\ d^1$, arranged in it in manner as shown, each set being furnished with a screw, $a^2$, for forcing one of its jaws toward the other, or away therefrom, as circumstances may require. There is fixed on the arbor B, which is supported in standards $f\ f$ of a frame, C, an adjusting disk or wheel, D, having as many holes $g\ g$ in it as there are sets of jaws, at equal distances asunder, a spring-bolt, $h$, arranged as shown, serving, when in either of the said holes, to confine the head in position. To cooperate with the rotary head there is, as represented, a series of arbors, E F G, supported in standards $i\ i$, they being arranged opposite three of the sets of jaws, which, instead of being disposed in one side of the rotary head, may be in its periphery, in which case the several arbors should be arranged in radial directions with said head; but this I do not consider so good an arrangement of the said parts as that shown by the accompanying drawings. To the inner end of the arbor G, which is the upper of the three, there is fixed a tool, $k$, for cutting a screw-thread on a blank, there being fixed to the lowest arbor a tool, $l$, for milling or shanking the blank—that is, for reducing it, so as to make it with a shank or body—the part held in the jaws being the head, which, like a common screw-head, may be nicked diametrically. The middle arbor F carries a tool, $m$, for pointing the blank.

While the machine is in operation, the set of jaws nearest the attendant is being supplied with a blank, each of the other sets having a blank in it. In the meanwhile one of such blanks is being reduced so as to form a shank on it, the other being pointed, and the third being threaded. These operations having been completed, the attendant next is to revolve the cutter-head ninety degrees of a circle, and remove the finished screw, and supply its jaws with a fresh blank. While he is doing this each of the other blanks will be operated on, one being milled, the next being pointed, and the third threaded. The arbor G, carrying the threading-tool, has upon it a sleeve, $m^1$, provided with two pulleys or wheels, $n$ $o$, applied to it so as to revolve on it, but without being capable of being moved endwise independently of the said sleeve. There is a stud, $p$ or $q$, projecting from the hub of each of the said wheels, and there are also two studs, $r$ $s$, extending radially from the arbor G. From the middle of the sleeve $m^1$ an arm descends, and pivots to a lever, $t$. The wheels $n$ $o$, by belts, are to be revolved in opposite directions.

On taking hold of the hand-lever $t$, and moving it so as to slide the sleeve endwise on the arbor, one of its wheels may be clutched thereto, so as to revolve the arbor in a direction to cause the threading-tool to advance on and cut a thread on the screw-blank; which having been done, the lever is to be moved in an opposite way, so as to clutch the other wheel with the arbor, and thereby cause it to revolve in a manner to run the threading-tool back and off the blank. The lowermost arbor E has upon it a sleeve or concentric tubular shaft, $u$, connected with it in such manner as to cause the sleeve, while being revolved, to revolve the arbor, with the latter free to move endwise or longitudinally in the sleeve. Furthermore, there is fixed on the sleeve a driving-wheel, $v$, and a grooved pulley, $w$. An endless band, $x$, goes around the said pulley $w$, and another pulley, $y$, on a shaft, $z$, provided with a screw, $a^3$. A worm-gear, $b^2$, fixed on a transverse shaft, $c^2$, engages with the said screw, there being on the shaft a pinion, $d^2$, that engages with a rack, $e'$, hung upon the arbor E, and between shoulders $f'$ $g'$ thereof. The arbor should be capable of revolving freely in the rack. The pulleys $w$ $y$, band $x$, shafts $z$ $c^2$, screw $a^3$, worm-gear $b^2$, gear $d^2$, and rack $e'$ constitute a mechanism for feeding the arbor E forward toward the rotary jawed head. The shaft $z$ turns, near its inner end, in a lever, $h'$, supported in and pivoted to a bracket, $i'$. This lever has projecting upward from it a spring-latch, $k'$, to operate with an adjustable escapement, $l'$.

Figure 8:
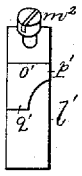
Figure 6:
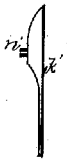
Figure 7:
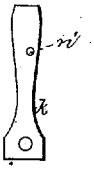

Fig. 6 is an edge elevation of the said latch, while Fig. 7 is a side view, and Fig. 8 an edge view, of the escapement. The latter is a cylinder, which turns on the shaft $c^2$, and is furnished with a set-screw, $m^2$, to clamp it thereto. The latch has a small stud, $n'$, extended from it. When the lever $h'$ is at its highest position, the stud $n'$, by bearing against the inner side of the escapement, causes the lever to be held in such position. In the periphery of the escapement is a notch, $o'$, opening out of the escapement, as shown at $p'$ and $q'$.

On completion of the milling or shanking of the blank, the notch $o'$ will have been moved around so that the stud $n'$ can enter it. On such taking place, the lever, and the shaft supported by it, will drop down, so as to throw the screw $a^3$ out of engagement with the worm-gear $b^2$. The attendant can next, by taking hold of the worm-gear and revolving it, cause the arbor E to be retracted; which being accomplished he is next to raise up the lever $h'$, so as to throw the stud into engagement with the worm-gear.

On the shaft $c^2$ there is fixed a cam, $r'$, against whose periphery the lower arm of a forked lever, $s'$, bears, such lever being made to embrace the arbor F between the shoulders $u'$ $v'$ thereof. A spring, $w'$, serves to draw the lever up to the cam, and aid in effecting retraction of the arbor after its tool may have pointed a blank. On the said arbor is a sleeve, $x'$, carrying a gear, $y'$, that engages with a pinion, $z'$, fixed on the sleeve $u$. Such arbor and sleeve $x'$ should have a spline or feather connection.

While the machine may be in operation it will mill or shank a blank, point another, and thread a third while one set of the jaws of the rotary head is having its screw removed and a fourth blank substituted.

In some cases the pointing-arbor and its tool and operative mechanism may be omitted, in which case the machine would both mill and thread a blank.

I claim as my invention as follows:

1. In a machine for milling and threading screws, the combination of mechanism for holding a series of screw-blanks with mechanism for milling or shanking one and simultaneously pointing or threading, or both pointing and threading, another of them, as described, while an attendant may be in the act of removing from the machine a screw-blank already held, milled, and pointed or threaded, or both pointed and threaded, and substituting therefor a blank to be, in turn, milled or pointed and threaded, or both pointed and threaded.

2. The improved machine as constructed with the rotary head A, provided with sets of jaws, as described, in combination with a series of two or more arbors, E F G, arranged to operate with such head, and furnished with tools, as described, to effect simultaneously the operations of milling or shanking a screw-blank and pointing or cutting a thread on another, while an attendant may be in the act of removing from one set of jaws of the head a screw-blank milled and threaded, or milled, pointed, and threaded, and substituting therefor a blank to be, in turn, milled and threaded, the said arbors being provided with mechanism for operating them, as specified.

3. The combination of the latch $k'$ and the escapement $l'$, as described, with the lever and the feeding mechanism, as described, of the arbor E, such feeding mechanism consisting of the pulleys $w$ $y$, band $x$, shafts $z$ $c^2$, screw $a^3$, worm-gear $b^2$, gear $d^2$, and rack $e'$, all being arranged as shown and explained.

4. The combination of the latch $k'$ and the escapement $l'$, as constructed and arranged in manner substantially as specified.

5. The combination of the sleeve $m^1$ and the studs $p$ $q$ $r$ $s$ with the two pulleys $n$ $o$ and the threading-arbor G, all being applied and to operate as specified.

6. The improved machine consisting of a series of two or more arbors and a head provided with mechanism for holding a series of screw-blanks, and also with mechanism for simultaneously milling or shanking one and pointing or cutting a thread on another of them, while an attendant may be in the act of removing from the machine a screw-blank already milled and pointed or threaded, and substituting for it a blank for being, in turn, milled, pointed, or threaded, all being substantially as set forth.

ALBERT W. GIFFORD.

Witnesses:
R. H. EDDY,
J. R. SNOW.